Jan. 15, 1957 P. AIGRAIN 2,777,975

COOLING DEVICE FOR SEMI-CONDUCTING ELEMENTS

Filed July 1, 1955

INVENTOR
PIERRE AIGRAIN
BY Paul M. Craig, Jr.
ATTORNEY.

2,777,975

COOLING DEVICE FOR SEMI-CONDUCTING ELEMENTS

Pierre Aigrain, Paris, France, assignor to Compagnie Generale de Telegraphie Sans Fil, a corporation of France Application July 1, 1955, Serial No. 519,471

Claims priority, application France July 3, 1954

4 Claims. (Cl. 317—234)

The present invention relates to a cooling device for semi-conducting elements, based on the Peltier effect.

It is well known that a current passing, in a suitable direction, through a contact surface between two conductors, absorbs a certain amount of heat, which is proportionate to the "Peltier coefficient" of the pair of conductors considered.

It is an object of the present invention to provide a particularly simple and economical cooling device, based on the Peltier effect, for cooling semi-conducting diodes and power transistors.

The invention will be more clearly understood from the ensuing description with reference to the appended drawing which illustrates some non-limitative embodiments of the invention in which.

Figure 1:
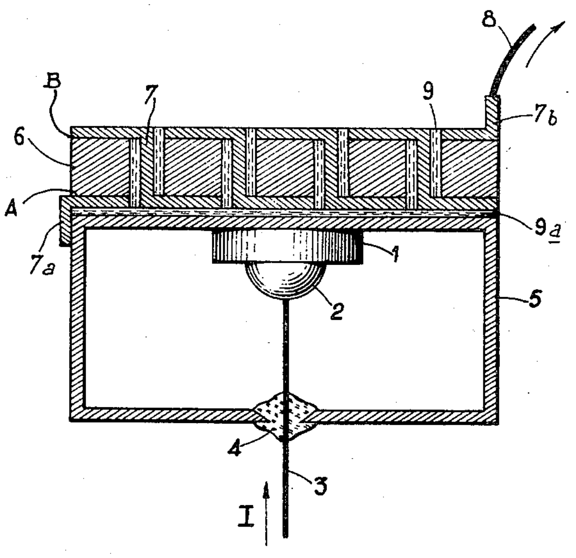
Fig. 1 is a cross-section through a germanium power diode provided with a cooling device using copper-indium antimonide couples.

The semi-conductive germanium diode shown in Fig. 1 is in the form of a disc or wafer 1 supporting a bead 2. The disc is of germanium and the bead of indium, the latter partly diffusing into the germanium disc. Thus, a "n" type zone and a "p" type zone are formed in the latter. Disc 1 is soldered, for instance, by means of a Kovar washer (not shown) to one of the walls of a cylindrical copper casing 5, which need not be vacuum-tight. A lead-in conductor 3 traverses a wall of the casing 5 from which it is insulated by a bead 4 of glass or the like and is connected to the bead 2. In the non-limitative example described, several indium antimonide bars 6 are arranged on the upper face of casing 5. By way of example, 13 bars, 1 mm. high (dimension parallel to connection 3); and 4 mm. long (dimension perpendicular to the plane of the figure) are used. Copper conductors 7 are soldered to these bars 6 so that the latter are electrically arranged in series and connected electrically both to casing 5 by a copper bar **7*a*, at one extremity of said series, and to a connection 8 by a copper bar 7*b* at the other extremity. Bars 6 are also insulated one from another by means of mica strips 9 and the arrangement is partly insulated from casing 5 by a mica strip 9*a***.

The bars 6 and conductors **7*a* and 7*b*** form a succession of couples A and B, couples A absorbing heat and couples B giving out heat through the Peltier effect.

The device shown in Fig. 1 operates as follows:

Current flows through the diode, in the direction shown by the arrow I, i. e. through the upper face of casing 5, copper bar **7*a*, bars 6 and conductors 7 in series to bar 7*b* and connection 8. Through the Peltier effect, couples A are constantly absorbing heat from the casing 5**. In the particular case described, the amount of heat drawn is of the order of 5 w. for a rectifying diode with 5 a. of current.

The Joule effect in the upper face of casing 5 and the bars 6 yielding about 8 w., said bars must dissipate about 13 w. through their upper and end surfaces which are in contact with the ambient atmosphere.

Figure 2:
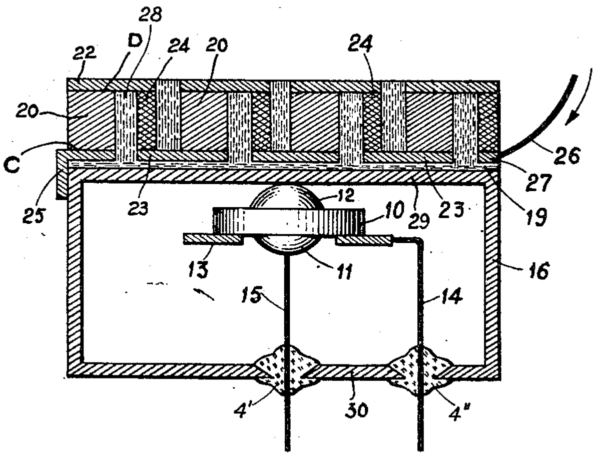
Fig. 2 is a similar view of a power transistor provided with a cooling device using bismuth-antimony couples and in which copper elements connect the bismuth and antimony conductors.

The power transistor shown in Fig. 2 comprises essentially a base 10 of "n" type germanium and a collector 11 and an emitter 12 of "p" type germanium. Base 10 is connected to a nickel washer 13 to which is soldered a connection 14. A connection 15 is secured to collector 11. Emitter 12 is soldered to the upper face 29 of a cylindrical casing 16. Connections 14 and 15 extend through casing wall 30 and are insulated therefrom at 4′ and 4″. The cooling device is insulated from the upper face 29 of casing 16 by means of a mica strip 19. It comprises, from left to right according to Fig. 2: a copper bar 25, connected to a wall of casing 16, an antimony bar 20, a copper bar 22, a bismuth bar 24, a copper bar 23, an antimony bar 20, etc., all these elements being series connected. A last copper bar 27 is connected to a lead-out 26. Adjacent bars 20 and 24 are insulated from each other by means of insulating layers 28.

The operation is the same as in the case of Fig. 1.

It is known that if intermediate metal, such as copper of the bars 22, 23 and 25, is inserted between the two metals of a couple, such as antimony of bars 20 and bismuth of bars 24, the same Peltier effect is produced at the junction of each of these metals with the copper as would have been produced at the junction of the two metals of the couple if there were no separating copper. Thus heat is absorbed at C and is provided at D.

It is understood that the above described arrangements are merely illustrative and that numerous modifications might be devised by those skilled in the art without departing from the spirit and scope of the invention.

What I claim is:

1. In combination, a semi-conductor having a terminal, at least one heat absorbing electrothermic couple in thermal contact and electrical connection with said semi-conductor and having a terminal, whereby said semi-conductor is cooled by a current flowing between said terminals.

2. In combination, a semi-conductor having a terminal, an electricity and heat conductive wall in heat and electricity conducting contact with said semi-conductor, at least one heat absorbing electro-thermic couple in heat and electricity conducting contact with said wall and having a terminal, whereby said semi-conductor is cooled by a current flowing between said terminals.

3. In combination, a semi-conductor having a terminal, an electricity and heat conductive wall in heat and electricity conducting contact with said semi-conductor, a plurality of alternately heat absorbing and heat emissive thermic couples electrically connected in a series, said heat absorbing thermic couples being in heat conducting contact with said wall, the first heat absorbing couple of said series being electrically connected to said wall and the last one having a terminal, whereby said semi-conductor is colled by a current flowing between said terminals.

4. In combination, a semi-conductor having a line terminal and a contact terminal, and a cooling device in heat exchange relationship with the surface of said contact terminal and comprising an electrical insulator layer having one face covering said surface, at least one heat absorbing electro-thermic couple covering the other face of said layer, a line terminal connected to said couple and an electrical connection between said contact terminal and couple bridging said layer whereby said line terminals are series-connected through said semi-conductor, contact terminal, connection and couple and said semi-conductor is cooled by said cooling device with current flowing from the first line terminal toward the second.

No references cited